(12) United States Patent
Hiraki et al.

(10) Patent No.: US 10,948,667 B2
(45) Date of Patent: Mar. 16, 2021

(54) PHOTOELECTRIC CONVERSION MODULE

(71) Applicant: LG Display Co., Ltd., Seoul (KR)

(72) Inventors: Katsuyoshi Hiraki, Tokyo (JP); Takayuki Suzuki, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/724,272

(22) Filed: Dec. 21, 2019

(65) Prior Publication Data
US 2020/0200984 A1 Jun. 25, 2020

(30) Foreign Application Priority Data
Dec. 25, 2018 (JP) .............................. JP2018-240677

(51) Int. Cl.
G02B 6/42 (2006.01)
G02B 7/02 (2021.01)

(52) U.S. Cl.
CPC ......... G02B 6/4214 (2013.01); G02B 6/4204 (2013.01); *G02B 7/027* (2013.01)

(58) Field of Classification Search
None
See application file for complete search history.

(56) References Cited

U.S. PATENT DOCUMENTS

| | | | | |
|---|---|---|---|---|
| 5,600,741 A * | 2/1997 | Hauer | ................... | G02B 6/4204 385/14 |
| 5,611,006 A * | 3/1997 | Tabuchi | ............... | G02B 6/4204 257/432 |
| 5,848,211 A * | 12/1998 | Yang | ...................... | G02B 6/423 385/93 |
| 5,862,283 A * | 1/1999 | Trott | .................... | G02B 6/4219 385/147 |
| 5,881,193 A * | 3/1999 | Anigbo | ................ | G02B 6/4201 385/93 |
| 5,937,114 A * | 8/1999 | Fisher | .................. | G02B 6/4277 385/14 |
| 7,149,376 B2 * | 12/2006 | Uchida | .................... | G02B 6/43 385/15 |
| 2003/0206703 A1 * | 11/2003 | Chiu | .................... | G02B 6/4208 385/93 |
| 2004/0081385 A1 * | 4/2004 | Karnacewicz | ....... | G02B 6/4201 385/14 |
| 2010/0284647 A1 * | 11/2010 | Stevenson | ............ | G02B 6/4249 385/14 |
| 2013/0182997 A1 * | 7/2013 | Fujiwara | .............. | G02B 6/4214 385/14 |
| 2014/0294352 A1 * | 10/2014 | Ertel | ........................ | G02B 6/32 385/93 |
| 2020/0183099 A1 * | 6/2020 | Grehn | .................. | G02B 6/4214 |

FOREIGN PATENT DOCUMENTS

JP 2005-235815 A 9/2005

* cited by examiner

*Primary Examiner* — Michael Stahl
(74) *Attorney, Agent, or Firm* — Polsinelli PC

(57) ABSTRACT

A photoelectric conversion module includes a circuit board; a photoelectric conversion element mounted on a first main surface of the circuit board; and an optical lens provided in an optical path between an end surface of an optical fiber and the photoelectric conversion element, wherein a part of the optical lens is inserted in a recessed portion formed in the first main surface of the circuit board.

15 Claims, 5 Drawing Sheets

PHOTOELECTRIC CONVERSION MODULE

CROSS REFERENCE TO RELATED APPLICATION

The present application claims priority from and the benefit under 35 U.S.C § 119(a) of Japanese Patent Application No. 2018-240677 filed on Dec. 25, 2018, which is hereby incorporated by reference in its entirety.

BACKGROUND

Field of the Disclosure

The present disclosure relates to a photoelectric conversion module.

Description of the Background

Conventionally, photoelectric conversion modules that perform high speed signal transmission have been used between boards or circuit blocks. The photoelectric conversion module of Japanese Patent Publication No. 2005-235815 (referred to herein as Patent document 1) includes a socket set up on a surface of a board and a photoelectric conversion plug capable of being inserted in the socket. The photoelectric conversion plug includes a photoelectric conversion element for converting an electric signal into an optical signal and an optical lens portion for concentrating the optical signal generated from the photoelectric conversion element at an end portion of an optical fiber.

However, in the photoelectric conversion module, since the photoelectric conversion plug including the optical lens portion in the socket on the board, the optical lens portion is disposed at a position as high as a lower wall of the socket with respect to the surface of the board. Therefore, there is a problem that the photoelectric conversion module becomes high with respect to the board and further apparatus using the photoelectric conversion module becomes large.

SUMMARY

Accordingly, the present disclosure is directed to a photoelectric conversion module that substantially obviates one or more of the problems due to limitations and disadvantages of the prior art.

More specifically, the present disclosure provides a thin photoelectric conversion module.

Additional features and advantages of the present disclosure will be set forth in the description which follows, and in part will be apparent from the description, or may be learned by practice of the present disclosure. The objectives and other advantages of the present disclosure will be realized and attained by the structure particularly pointed out in the written description and claims hereof as well as the appended drawings.

To achieve these and other advantages and in accordance with the purpose of the present disclosure, as embodied and broadly described herein, there is provided a photoelectric conversion module that includes a circuit board; a photoelectric conversion element mounted on a first main surface of the circuit board; and an optical lens provided in an optical path between an end surface of an optical fiber and the photoelectric conversion element, wherein a part of the optical lens is inserted in a recessed portion formed in the first main surface of the circuit board.

It is to be understood that both the foregoing general description and the following detailed description are exemplary and explanatory and are intended to provide further explanation of the present disclosure as claimed.

BRIEF DESCRIPTION OF THE DRAWINGS

The accompanying drawings, which are included to provide a further understanding of the present disclosure and which are incorporated in and constitute a part of the disclosure, illustrate aspects of the present disclosure and together with the description serve to explain the principles of the present disclosure.

In the drawings.

DETAILED DESCRIPTION

Reference will now be made in detail to aspects of the disclosure, examples of which are illustrated in the accompanying drawings. In the aspects, same parts may be designated by the same references, and explanation for the same parts may be omitted or simplified.

First Aspect

Figure 1:
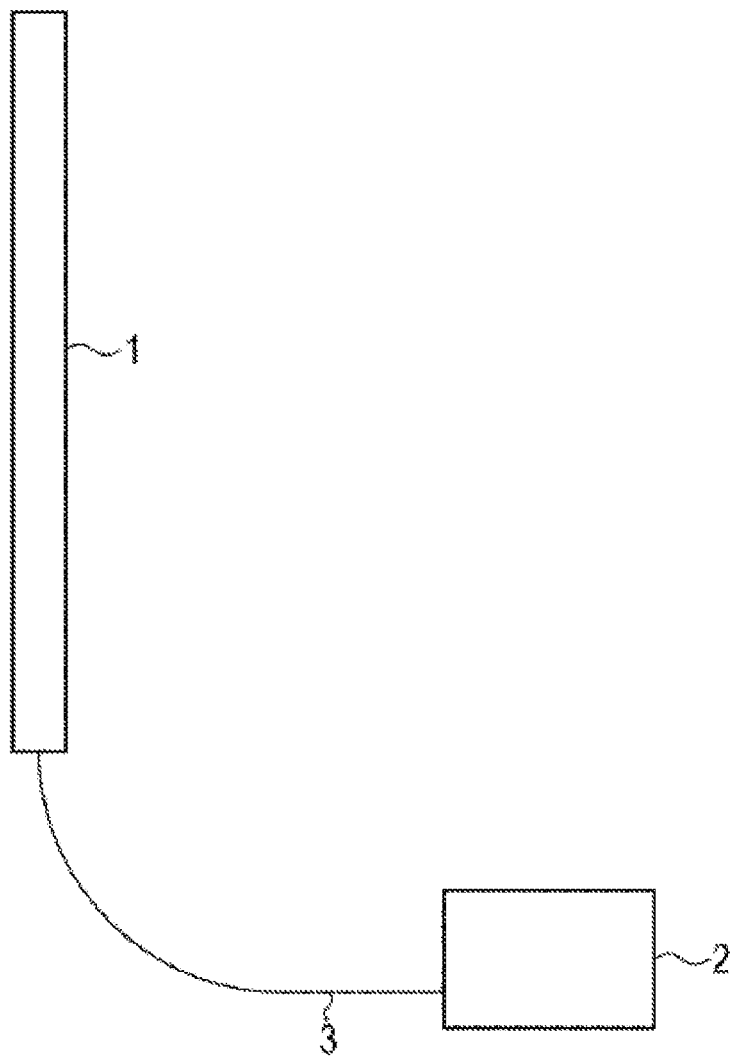
FIG. 1 is a view illustrating an example of electronic equipment using a photoelectric conversion module according to a first aspect of the present disclosure.

FIG. 1 is a view illustrating an example of electronic equipment using a photoelectric conversion module according to a first aspect of the present disclosure. For example, the electronic equipment may include a flat panel display 1 as a display device and a control unit 2. Each of the flat panel display 1 and the control unit 2 includes a photoelectric conversion module according to the first aspect, and the flat panel display 1 and the control unit 2 are mutually connected by an optical fiber 3. The optical fiber 3 includes a core material such as quartz glass, resin or the like having a relatively high refractive index and a cladding that covers the core material and has a relatively low refractive index. In addition, in FIG. 1, although the flat panel display 1 and the control unit 2 are installed in different housings, respectively, the flat panel display 1 and the control unit 2 may be set up in the same housing.

The flat panel display 1 is a flat display device such as a liquid crystal display, an organic electroluminescent display or the like. When the flat panel display 1 is made of a liquid crystal display, the display panel includes a substrate, pixel thin film transistors (TFTs), a liquid crystal layer, a polarizer, a color filter, a backlight unit, and the like. The pixel TFTs are arranged in a matrix shape and are connected to gate lines and data lines. A storage capacitor and a liquid crystal capacitor are connected to the pixel TFT. The liquid crystal capacitor maintains the difference voltage between a signal voltage V supplied from the data line and a common voltage while driving the liquid crystal to control the light transmittance. The storage capacitor keeps the voltage maintained by the liquid crystal capacitor stable. The liquid crystal layer may be driven by a twisted nematic (TN) mode, a vertical alignment (VA) mode, an in-plane switching (IPS) mode, a fringe field switching (FFS) mode, and the like.

Alternatively, when the flat panel display 1 is made of an organic EL display, the flat panel display 1 includes a substrate, an inorganic layer, which is a barrier layer, formed on the substrate, and an OLED layer formed on the inorganic layer. The substrate is typically a glass substrate. However, the substrate may be a film substrate having flexibility such as polymer material, for example, polyamide. The inorganic material is formed of an inorganic material, for example, silicon nitride. The OLED layer includes layers of an anode, a cathode, a light-emitting layer, and the like, and has a plurality of OLED elements arranged in an array shape. The flat panel display 1 may be a bottom emission type in which light generated in the OLED layer is emitted toward the substrate or a top emission type in which light generated in the OLED layer is emitted toward an opposite direction to the substrate.

The flat panel display 1 is not limited to the above-described configuration and may have various configurations. For example, the flat panel display 1 may be a flexible display that can be bent. In this case, a material having flexibility such as a plastic film may be used for the substrate constituting the flat panel display 1. In addition, a touch panel may be provided on a display surface of the flat panel display 1.

Further, a connection terminal is provided at a side of the flat panel display 1. The optical fiber 3 is connected to the connection terminal. The connection terminal of the optical fiber 3 may be provided at a portion which does not inhibit the thinness of the flat panel display 1 such as a side or a bottom of the housing of the flat panel display 1.

For example, the control unit 2 is a stationary device independent from the flat panel display 1 such as a set top box (STB), for example. The control unit 2 may include a central processing unit (CPU), a read only memory (ROM), a random access memory (RAM), an image processing circuit, a receiving circuit, and the like. A computer system composed of a CPU, a ROM, a RAM, and the like controls the overall operation of the flat panel display 1 including a timing controller. The image processing circuit includes a digital signal processor (DSP) frame memory or the like and performs gamma correction, noise reduction processing, and the like.

The CPU controls the overall operation of the control unit 2 according to a predetermined application program. The ROM preserves the stored contents even after the power is off, such as a nonvolatile memory. The RAM is used as a work area for the operation of the CPU.

The receiving circuit converts the broadcast signals of digital broadcasting and cable television through radio waves or cables into video and audio signals by performing demodulation, error correction and decoding processes. For example, orthogonal frequency-division multiplexing (OFDM) demodulation is used in the demodulation process. Viterbi decoding is used in the error correction process. Reed Solomon (RS) decoding is used in the decoding process.

In addition, the connection terminal of the optical fiber 3 may be installed at the side of the housing of the control unit 2. The optical fiber 3 is connected to the connection terminal.

The control unit 2 performs demodulation, error correction and decoding processes upon receiving the broadcast signals through the radio waves or cables and converts the broadcast signals into the video and audio signals. The converted video and audio signals are converted into optical signals by a photoelectric conversion module and transmitted to the flat panel display 1 through the optical fiber 3.

The flat panel display 1 converts the optical signals transmitted from the control unit 2 into the video and audio signals by the built-in photoelectric conversion module. The flat panel display 1 displays the video signal among the video and audio signals on the display screen. The audio signals, for example, may be reproduced using a sound reproducing apparatus built in the flat panel display 1 or a stationary speaker equipped with an amplifier.

Figure 2:
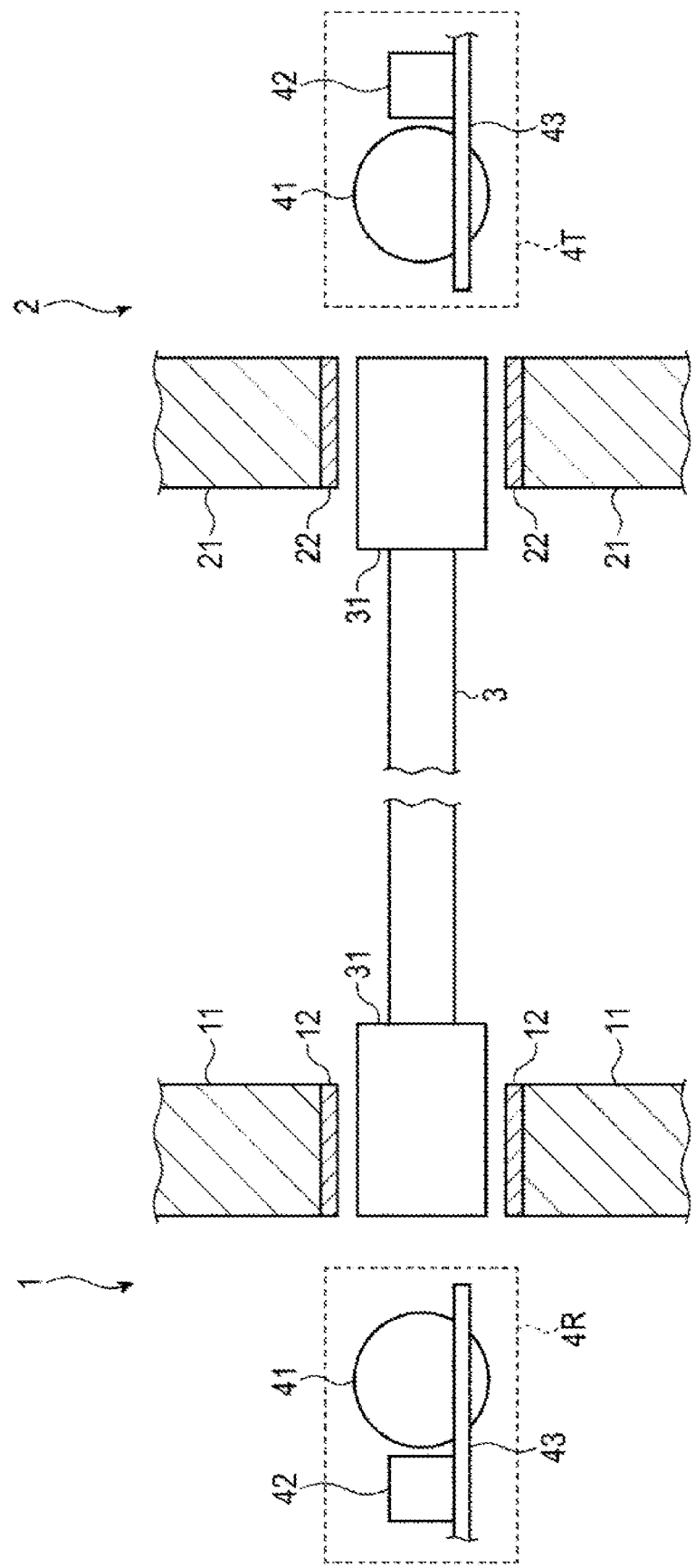
FIG. 2 is a cross-sectional view partially illustrating a flat panel display and a control unit.

FIG. 2 is a cross-sectional view partially illustrating a flat panel display and a control unit. As described above, the flat panel display 1 and the control unit 2 may be connected to each other through the optical fiber 3.

The flat panel display 1 includes a housing 11 and a circuit board 43. An opening is formed in the housing 11, and a connector housing 12 is provided in the opening. The circuit board 43 is provided in the housing 11, and circuit components such as a driving circuit and a control circuit are mounted on the circuit board 43. In addition, a photoelectric conversion module 4R is provided at an edge portion of the circuit board 43. The photoelectric conversion module 4R includes an optical lens 41 and a photoelectric conversion portion 42. The optical signals from the optical fiber 3 is photoelectrically converted by the photoelectric conversion module 4R and output to the driving circuit and the control circuit. The opening is formed in a position of the housing 11 corresponding to the photoelectric conversion module 4R, and the connector housing 12 is provided in the opening. The connector housing 12 has a cylindrical shape, and one connector 31 of the optical fiber 3 is inserted into the connector housing 12. Here, the connector 31 may include a collimator for holding an end portion of the optical fiber 3 and concentrating the optical signals. The collimator, for example, may be formed of a ball lens. The housing 11 and the connector housing 12, for example, may be formed of plastic, ABS (acrylonitrile butadiene styrene) resin or the like.

Similarly, the control unit 2 includes a housing 21 and a circuit board 43. Circuit components for controlling the flat panel display 1 are mounted on the circuit board 43. A photoelectric conversion module 4T is provided in at an edge portion of the circuit board 43. The photoelectric conversion module 4T includes an optical lens 41 and a photoelectric conversion portion 42. An opening is formed in a position of the housing 21 corresponding to the photoelectric conversion module 4T, a connector housing 22 is provided in the opening, and the other connector 31 of the optical fiber 3 is inserted in the connector housing 22.

Figure 3:
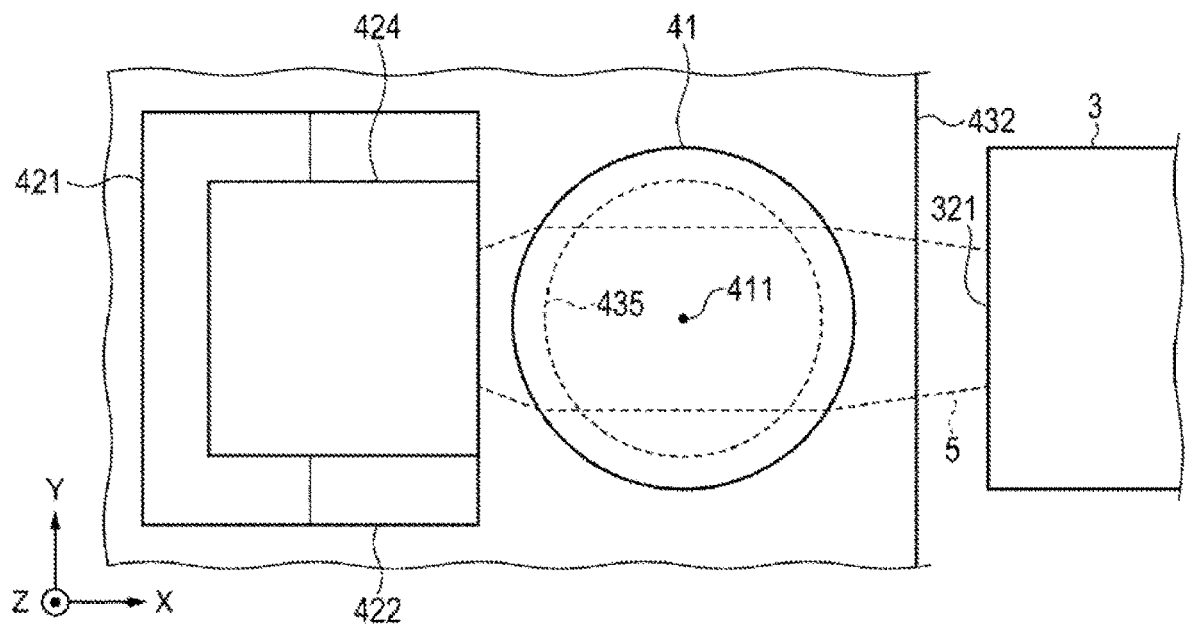
FIG. 3 is a top view of a photoelectric conversion module according to the first aspect of the present disclosure.
Figure 4:
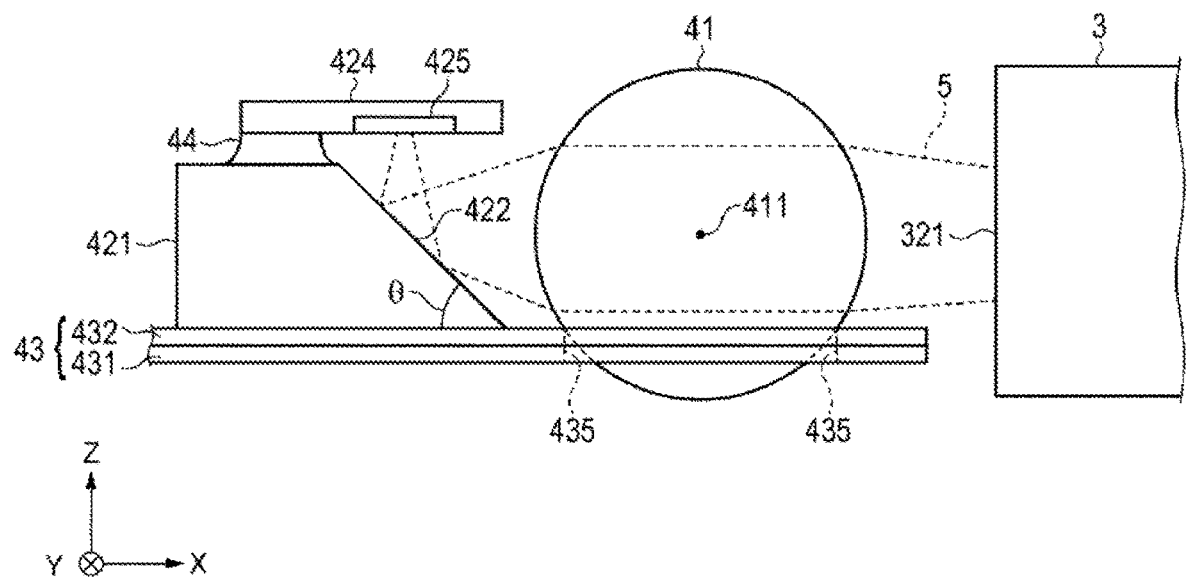
FIG. 4 is a cross-sectional view of a photoelectric conversion module according to the first aspect of the present disclosure.

FIG. 3 is a top view of a photoelectric conversion module according to the first aspect, and FIG. 4 is a cross-sectional view of a photoelectric conversion module according to the first aspect. In FIG. 3 and FIG. 4, two directions parallel to a main surface of the circuit board 43 and orthogonal to each other are referred to as X and Y directions and a direction perpendicular to the main surface of the circuit board 43 is referred to as an Y direction. In the following description, the photoelectric conversion module 4 of the flat panel display 1 will be described as an example. The photoelectric conversion module 4 is provided on the circuit board 43 and includes an optical lens 41, a base member 421, a reflector 422, and a photoelectric conversion element 424.

The circuit board 43 may be a multilayer board including an insulating layer 431 and a metal layer 432. The insulating layer 431, which is a printed circuit board (PCB), for example, may be formed of paper phenol or glass epoxy. The metal layer 432 is formed of copper, aluminum or the like. In addition, the circuit board 43 may be flexible printed circuits (FPCs).

The circuit board 43 has a recessed portion 435, which is a circular opening, and the recessed portion 435 forms a through hole from a first main surface to a second main surface of the circuit board 43. The optical lens 41 is inserted into the recessed portion 435. The optical lens 41 has a spherical shape and for example, may be a ball lens. The optical lens 41 may be formed of glass, resin or the like. A diameter of the optical lens 41 is larger than an opening diameter of the recessed portion 435. The optical lens 41 is inserted from the first main surface of the circuit board 43, and a part of the optical lens 41 protrudes from the second main surface of the circuit board 43. Therefore, a height from the first main surface of the circuit board 43 to a center 411 of the optical lens 41 can be made low.

The height from the first main surface of the circuit board 43 to the center 411 may be approximately equal to a height from the first main surface of the circuit board 43 to a center of an end surface 321 of the optical fiber 3. In this case, an optical path between the end surface 321 of the optical fiber 3 and the optical lens 41 is substantially parallel to the first main surface of the circuit board 43. In addition, it is desirable that the optical lens 41 is so close that it does not contact the end surface 321 of the optical fiber 3.

The base member 421 is formed of resin or metal and has a box shape with a trapezoidal cross section. A bottom surface of the base member 421 is bonded to the circuit board 43. The base member 421 has an inclined surface that forms a predetermined angle with respect to the circuit board 43, and the reflector 422 is formed on the inclined surface. The angle θ formed between the reflector 422 and the circuit board 43 may be 45 degrees, for example.

The reflector 422 is provided to face the end surface 321 of the optical fiber 3. The reflector 422 may be formed of a plated aluminum alloy or the like. In the photoelectric conversion module 4T, the reflector 422 reflects the optical signal 5 from the photoelectric conversion element 424T to the optical lens 41, and in the photoelectric conversion module 4R, the reflector 422 reflects the optical signal 5 from the optical lens 41 to the photoelectric conversion element 424R. The base member 421 and the reflector 422 may be formed of copper, silver or the like in addition to the aluminum alloy. Further, the base member 421 may be formed of a prism, and the reflector 422 may be one surface of the prism.

A land 44 of a metal line is formed on an upper surface of the base member 421, and the photoelectric conversion element 424 is connected to the land 44 by soldering. The photoelectric conversion element 424 is electrically connected to the circuit board 43 through a patterned line connected to the land 44.

The photoelectric conversion element 424 has a light-receiving surface 425, which is arranged parallel to the main surface of the circuit board 43 while facing the circuit board 43. When the photoelectric conversion module 4 is installed in the flat panel display 1, the photoelectric conversion element 424 may be a photo diode (PD), for example.

In the above-described configuration, the optical signal 5 generated from the end surface 321 of the optical fiber 3 is concentrated by the optical lens 41 and reflected upward by the reflector 422. Furthermore, the light reflected by the reflector 422 is incident on the light-receiving surface 425 of the photoelectric conversion element 424. The photoelectric conversion element 424 outputs an electrical signal according to the intensity of the incident light. The output electrical signal is amplified by an amplifier circuit not shown.

In addition, when the photoelectric conversion module 4 is installed in the control unit 2, the photoelectric conversion module 4 may be a light-emitting element, for example, a vertical cavity surface emitting laser (VCSEL). In this case, the photoelectric conversion element 424 converts the video and audio signal of the circuit board 43 into the optical signal 5 and irradiates the optical signal 5 from a light-emitting surface toward the reflector 422. The optical signal 5 is reflected by the reflector 422, is concentrated by the optical lens 41 and is incident on the end surface 321 of the optical fiber 3.

As described above, according to the first aspect, the height of the optical lens with respect to the circuit board can be made low by inserting the part of the optical lens in the recessed portion formed in the circuit board. As a result, it is possible to realize a thin photoelectric conversion module. In addition, it is not necessary to determine the position of the optical lens on the circuit board by inserting the optical lens in the recessed portion formed in the circuit board. In the manufacturing process of the circuit board, by forming the recessed portion with a predetermined position and size, it is possible to accurately arrange the optical lens on the circuit board.

Second Aspect

Subsequently, a photoelectric conversion module according to a second aspect will be described. In the following description, configurations different from the first aspect will be mainly described. The description for the same configurations as the first aspect will be omitted. The photoelectric conversion module 4 of the flat panel display 1 will be described as an example.

Figure 5:
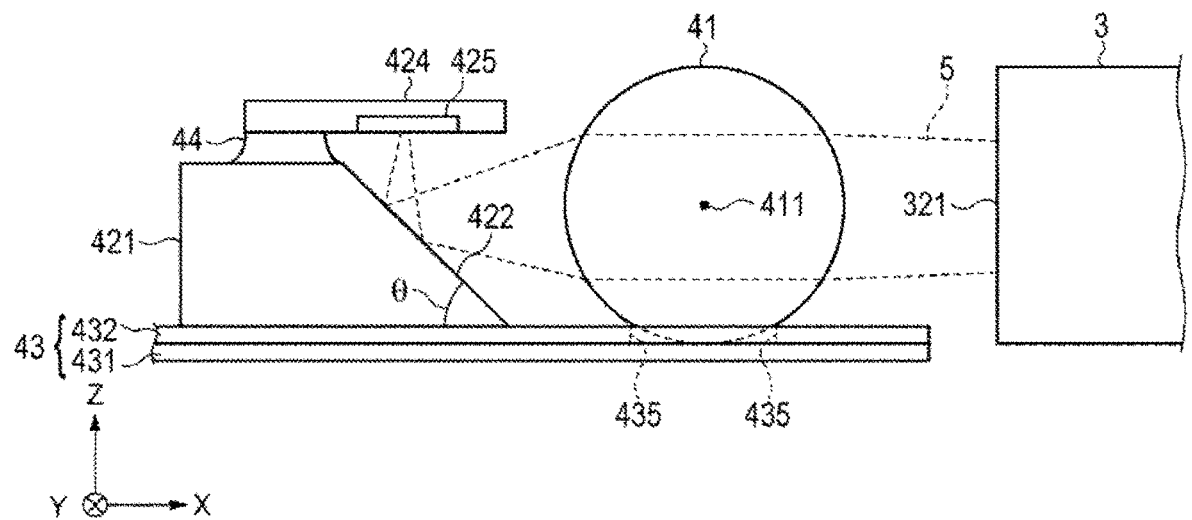
FIG. 5 is a cross-sectional view of a photoelectric conversion module according to a second aspect of the present disclosure.

FIG. 5 is a cross-sectional view of a photoelectric conversion module according to the second aspect of the present disclosure. The circular recessed portion 435 is formed in the metal layer 432 of the circuit board 43. That is, a step is formed between the end portion of the metal layer 432 and the surface of the circuit board 43, and the recessed portion 435 is formed in a region where the surface of the circuit board 43 is exposed. Here, the recessed portion 435 may be formed by etching the metal layer 432. The optical lens 41 is inserted in the recessed portion 435. Although the recessed portion 435 is provided on the first main surface of the circuit board 43, the recessed portion 435 does not protrude in the second main surface of the circuit board 43 because the recessed portion 435 does not penetrate the second main surface of the circuit board 43. However, the position of the optical lens 41 with respect to the circuit board 43 can be made low as compared with the case where the optical lens 41 is arranged on the metal layer 432.

As described above, according to the second aspect, the height of the optical lens with respect to the circuit board can be made low by inserting the part of the optical lens in the recessed portion formed in the circuit board. In addition, since it is not necessary to process the circuit board as compared with the first aspect, the manufacturing process of the photoelectric conversion module can be simplified.

Third Aspect

A photoelectric conversion module according to a third aspect will be described. In the following description, configurations different from the first aspect will be mainly described. In the third aspect, the photoelectric conversion element 424 is mounted on the circuit board 43. The description for the same configurations as the first aspect will be omitted. The photoelectric conversion module 4 of the flat panel display 1 will be described as an example.

Figure 6:
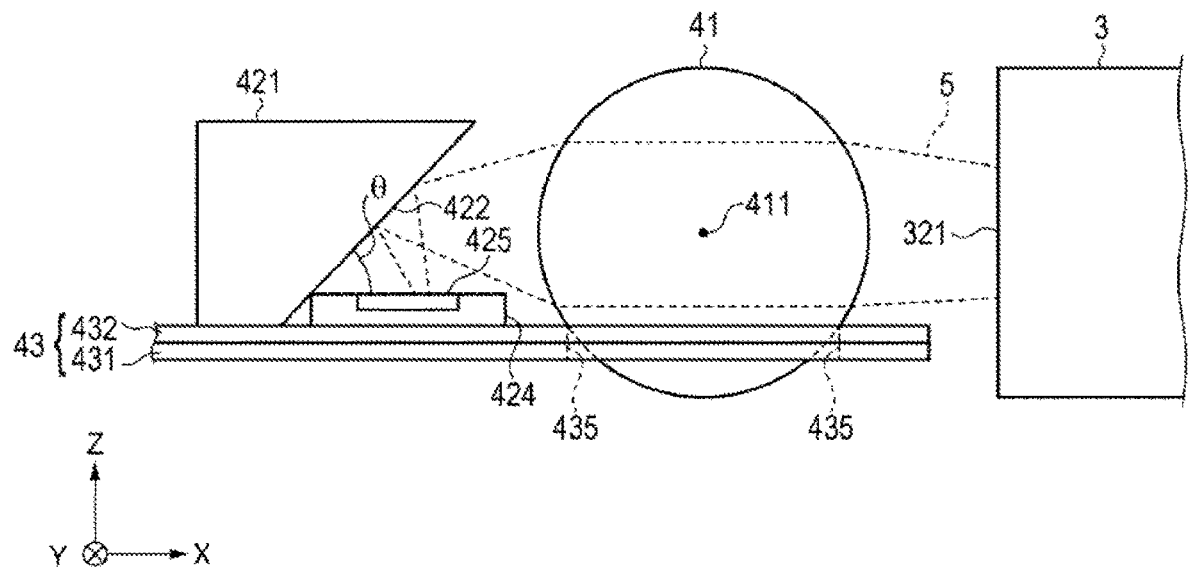
FIG. 6 is a cross-sectional view of a photoelectric conversion module according to a third aspect of the present disclosure.

FIG. 6 is a cross-sectional view of a photoelectric conversion module according to the third aspect of the present disclosure. The photoelectric conversion element 424 is provided such that the light-receiving surface 425 faces upwards and is parallel to the circuit board 43, for example. The base member 421 has a substantially box shape and has a trapezoidal cross section. The base member 421 has an inclined surface that forms a predetermined angle with respect to the light-receiving surface 425, and the reflector 422 is formed on the inclined surface. The angle θ formed between the reflector 422 and the light-receiving surface 425 may be 45 degrees, for example. In addition, the bottom surface of the base member 421 is fixed to the circuit board 43.

In the above-described configuration, the optical signal 5 generated from the end surface 321 of the optical fiber 3 is concentrated by the optical lens 41 and reflected downward by the reflector 422. Furthermore, the light reflected by the reflector 422 is incident on the light-receiving surface 425 of the photoelectric conversion element 424.

As described above, according to the third aspect, the photoelectric conversion element may be directly wired to the circuit board, thereby easily planning the wiring layout of the photoelectric conversion element and the circuit board.

Fourth Aspect

A photoelectric conversion module according to a fourth aspect will be described. In the following description, configurations different from the first aspect will be mainly described. The description for the same configurations as the first aspect will be omitted. The photoelectric conversion module 4 of the flat panel display 1 will be described as an example.

Figure 7:
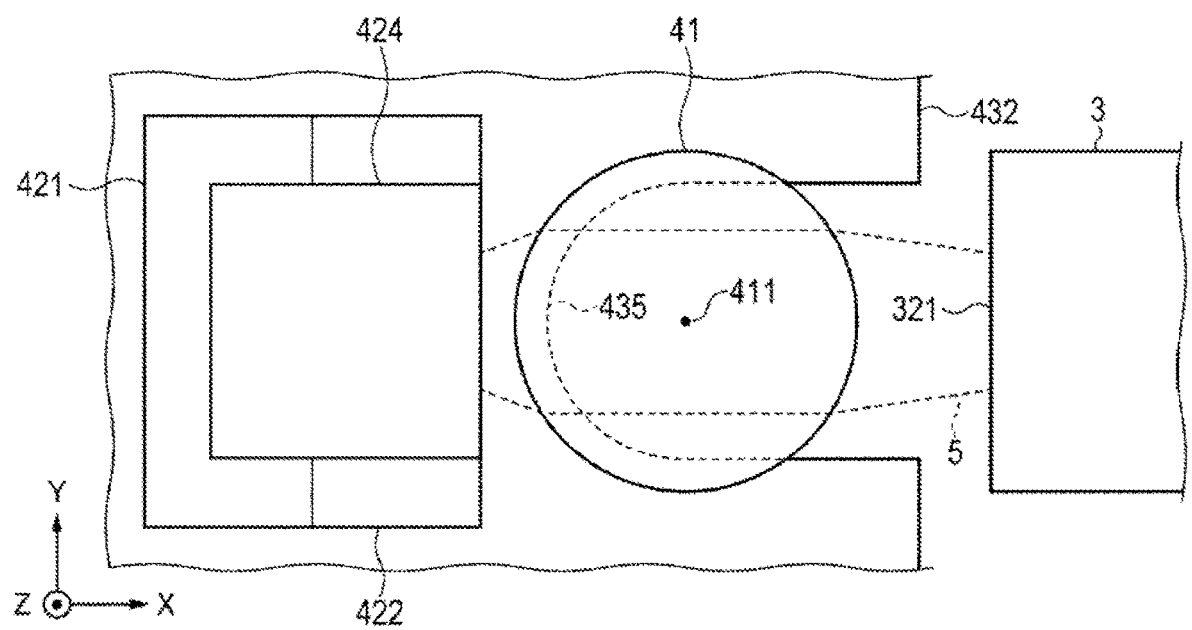
FIG. 7 is a top view of a photoelectric conversion module according to a fourth aspect of the present disclosure.

FIG. 7 is a top view of a photoelectric conversion module according to the fourth aspect of the present disclosure. The recessed portion 435, which is a notch, is formed in the circuit board 43. That is, the circuit board 43 is processed such that its end portion has a U shape when seen in a plan view. In the recessed portion 435, the optical lens 41 is inserted in a semicircular portion of the opening. At this time, the diameter of the optical lens 41 is larger than the diameter of the opening of the recessed portion 435.

As described above, according to the fourth aspect, the recessed portion is formed by the notch part at the end portion of the circuit board. It is easy to form the recessed portion as compared with the case where the circular opening is provided.

Fifth Aspect

A photoelectric conversion module according to a fifth aspect will be described. In the fifth aspect, the photoelectric conversion module is configured without using a reflector. In the following description, configurations different from the first aspect will be mainly described. The description for the same configurations as the first aspect will be omitted. The photoelectric conversion module 4 of the flat panel display 1 will be described as an example.

Figure 8:
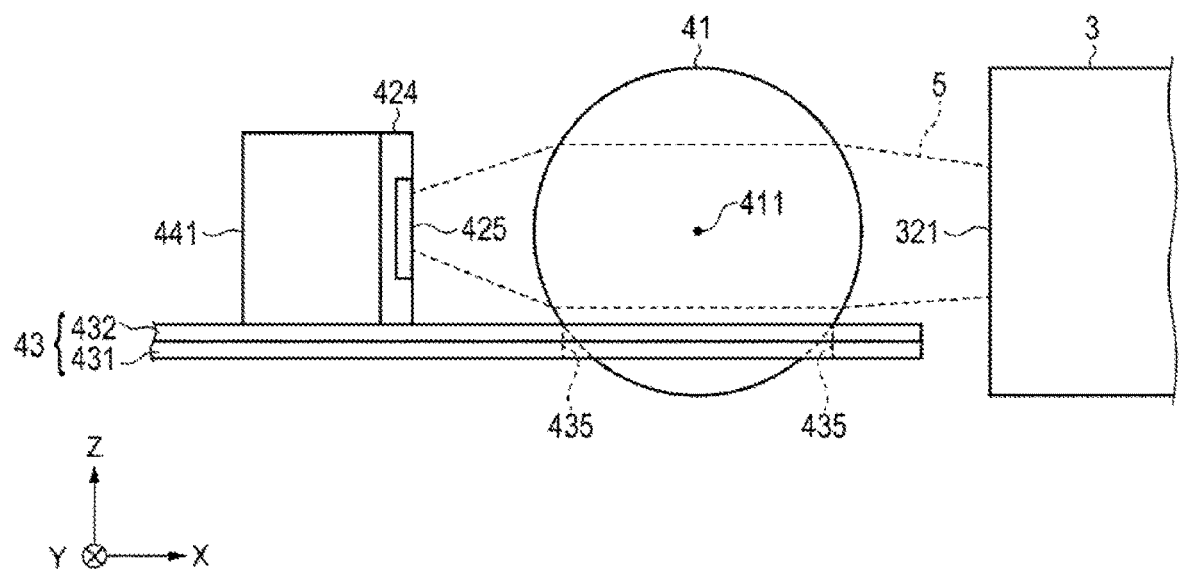
FIG. 8 is a cross-sectional view of a photoelectric conversion module according to a fifth aspect of the present disclosure.

FIG. 8 is a cross-sectional view of a photoelectric conversion module according to the fifth aspect of the present disclosure. The base member 441 has a substantially box shape. The bottom surface of the base member 441 is bonded to the circuit board 43. One side surface of the base member 441 is provided to face the end surface 321 of the optical fiber 3.

The photoelectric conversion element 424 is provided on the one side surface of the base member 441. The one side surface of the base member 441 is a surface facing the end surface 321 of the optical fiber 3. The light-receiving surface 425 faces the end surface 321 of the optical fiber 3 and is disposed, for example, vertically with respect to the circuit board 43.

In the above-described configuration, the optical signal 5 generated from the end surface 321 of the optical fiber 3 is concentrated by the optical lens 41 and is incident on the light-receiving surface 425 of the photoelectric conversion element 424.

As described above, according to the fifth aspect, since the photoelectric conversion module is configured without using a reflector, it is possible to reduce the manufacturing costs and manufacturing processes.

According to the present disclosure, it is possible to provide a thin photoelectric conversion module by providing the part of the optical lens at a position lower than the surface of the circuit board.

It will be apparent to those skilled in the art that various modifications and variations can be made in a display device of the present disclosure without departing from the sprit or scope of the aspects. Thus, it is intended that the present disclosure covers the modifications and variations of this disclosure provided they come within the scope of the appended claims and their equivalents.

What is claimed is:

1. A photoelectric conversion module comprising:
   a circuit board;
   a photoelectric conversion element mounted on a first main surface of the circuit board; and
   a spherical optical lens provided in an optical path between an end surface of an optical fiber and the photoelectric conversion element,
   wherein a part of the spherical optical lens is inserted in a recessed portion formed in the first main surface of the circuit board,
   wherein a diameter of the spherical optical lens is larger than an opening diameter of the recessed portion,
   wherein the photoelectric conversion element includes a bottom surface facing the first main surface of the circuit board and a top surface opposite the bottom surface,
   wherein the diameter of the spherical optical lens is greater than a length of a second main surface of the circuit board to the top surface of the photoelectric conversion element, and
   wherein the second main surface of the circuit board is on an opposite side of the first main surface of the circuit board.

2. The photoelectric conversion module of claim 1, further comprising a reflector provided in an optical path between the spherical optical lens and the photoelectric conversion element.

3. The photoelectric conversion module of claim 2, wherein the reflector reflects an optical signal parallel to the first main surface of the circuit board toward a direction perpendicular to the first main surface of the circuit board, and
wherein a light-receiving surface or a light-emitting surface of the photoelectric conversion element is disposed parallel to the first main surface of the circuit board.

4. The photoelectric conversion module of claim 1, wherein a light-receiving surface or a light-emitting surface of the photoelectric conversion element is disposed perpendicularly to the first main surface of the circuit board.

5. The photoelectric conversion module of claim 1, wherein the recessed portion is a through hole penetrating from the first main surface to the second main surface of the circuit board.

6. The photoelectric conversion module of claim 5, wherein the part of the spherical optical lens protrudes from the second main surface of the circuit board.

7. The photoelectric conversion module of claim 1, wherein the recessed portion is a notch part formed at an end portion of the circuit board.

8. The photoelectric conversion module of claim 1, wherein the recessed portion is formed in a metal layer of the circuit board.

9. A photoelectric conversion module comprising:
a circuit board;
a photoelectric conversion element mounted on a first surface of the circuit board;
a spherical optical lens disposed in an optical path between an optical fiber and the photoelectric conversion element; and
a reflector disposed in an optical path between the spherical optical lens and the photoelectric conversion element and having an inclined surface with respect to the circuit board,
wherein the spherical optical lens has a part inserted in a recessed portion in the first surface of the circuit board,
wherein a diameter of the spherical optical lens is larger than an opening diameter of the recessed portion,
wherein the photoelectric conversion element includes a bottom surface facing the first surface of the circuit board and a top surface opposite the bottom surface,
wherein the diameter of the spherical optical lens is greater than a length of a second main surface of the circuit board to the top surface of the photoelectric conversion element, and
wherein the second main surface of the circuit board is on an opposite side of the first surface of the circuit board.

10. The photoelectric conversion module of claim 9, wherein the reflector reflects an optical signal parallel to the first surface of the circuit board toward a direction perpendicular to the first surface of the circuit board, and
wherein a light-receiving surface or a light-emitting surface of the photoelectric conversion element is disposed parallel to the first surface of the circuit board.

11. The photoelectric conversion module of claim 9, wherein the recessed portion is a through hole penetrating from the first surface to a second surface of the circuit board.

12. The photoelectric conversion module of claim 11, wherein the part of the spherical optical lens protrudes from the second surface of the circuit board.

13. The photoelectric conversion module of claim 9, wherein the recessed portion is a notch part formed at an end portion of the circuit board.

14. The photoelectric conversion module of claim 9, wherein the recessed portion is formed in a metal layer of the circuit board.

15. The photoelectric conversion module of claim 9, wherein the circuit board comprises an insulation layer and a metal layer disposed on the insulation layer.

\* \* \* \* \*